Figure 5:
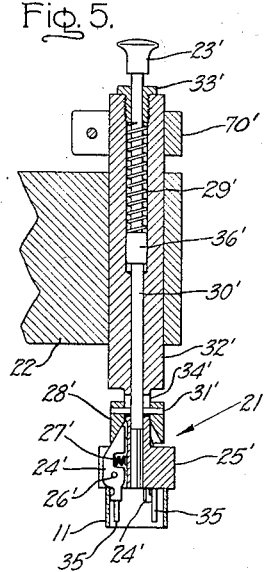

Jan. 17, 1950 A. GREINER 2,494,870
APPARATUS FOR SEALING GLASS AND METAL MEMBERS
Filed Feb. 17, 1944 2 Sheets-Sheet 1
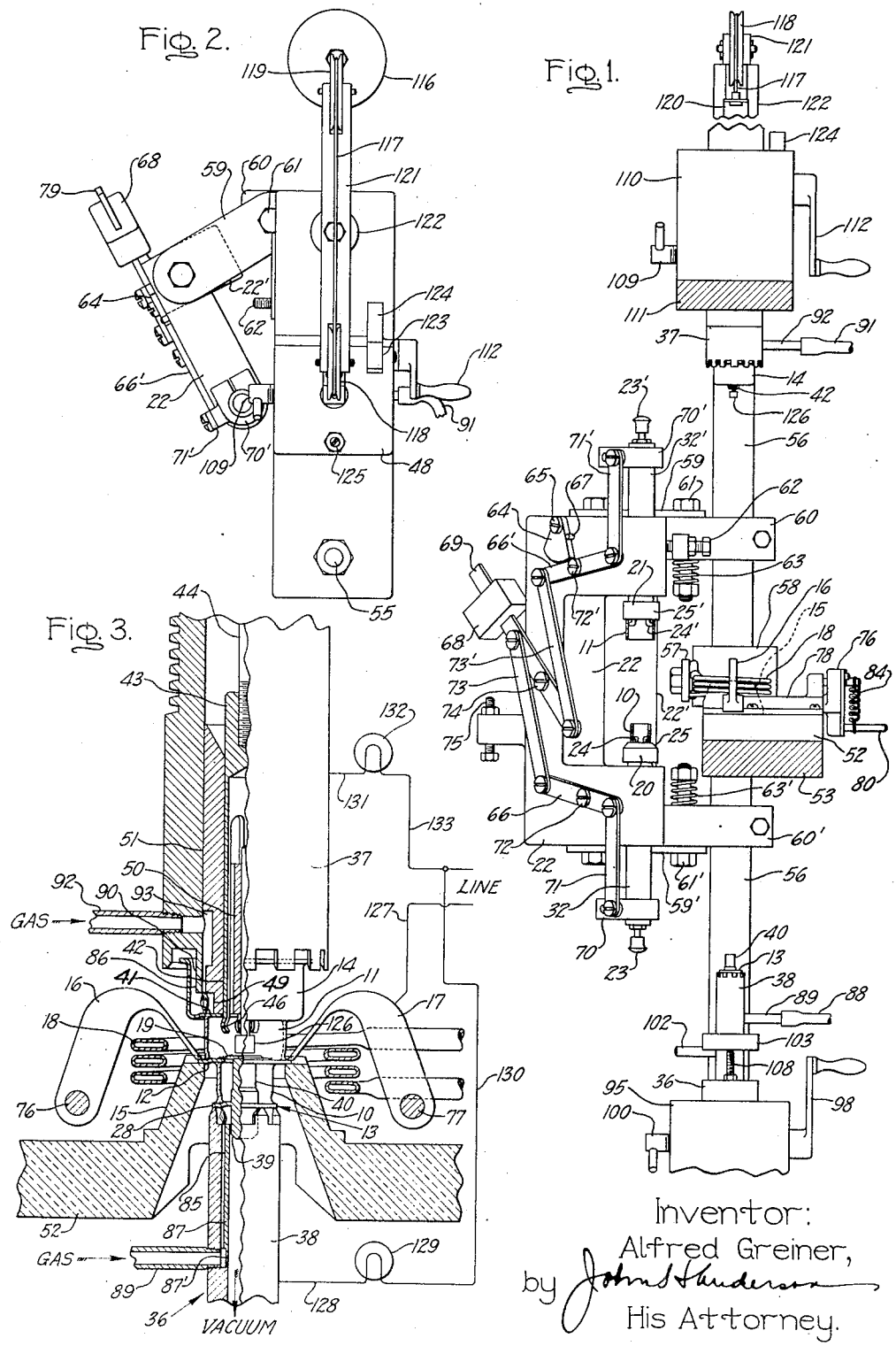
Inventor:
Alfred Greiner,
by John J Henderson
His Attorney.

Jan. 17, 1950  A. GREINER  2,494,870
APPARATUS FOR SEALING GLASS AND METAL MEMBERS
Filed Feb. 17, 1944  2 Sheets-Sheet 2

Inventor:
Alfred Greiner,
by John S. Anderson
His Attorney.

Patented Jan. 17, 1950

2,494,870

UNITED STATES PATENT OFFICE 2,494,870

APPARATUS FOR SEALING GLASS AND METAL MEMBERS

Alfred Greiner, Cleveland Heights, Ohio, assignor to General Electric Company, a corporation of New York Application February 17, 1944, Serial No. 522,820

17 Claims. (Cl. 49—2)

My invention relates to apparatus for sealing together glass and metal elements of electronic tubes, lamps and the like and more particularly to apparatus for sealing together an assembly of glass and metal elements of such electrical devices.

The formation of seals between glass and metal parts requires a high degree of skill and care inasmuch as the operation of heating said parts to the sealing temperature in the usual manner of operation is very difficult to control with the exactness required. Usually the sealing operation is also hampered by the form of the glass and metal parts which must therefore be carefully prepared to assure a thorough wetting of the glass part to the metal part and the formation of a strong and entirely satisfactory seal. The difficulty of controlling the heating means is increased by the desirability of restricting the distribution of heat to the glass and metal parts and preventing the over-heating of said parts inasmuch as either condition results in a distortion of one or the other part. Such distortion is particularly undesirable where the relationship of the metal parts is important to their proper function in the electrical device, a situation most generally found where several of said glass and metal parts are to be formed through a multiplicity of closely arranged seals. The complexity of the operation greatly increases with the number and the nearness of the seals to each other because of the transfer of heat between the various parts.

One object of my invention is to provide apparatus for readily sealing glass and metal elements together wherein a minimum of skill is required and seals so produced are consistently strong and accurate.

Another object of my invention is to provide apparatus for sealing metal elements to the opposite ends of a relatively short glass element, the metal elements being very accurately positioned with respect to each other and the glass elements being fused to a strong seal therewith and otherwise undistorted.

Another object of my invention is to provide apparatus for sealing a plurality of glass and metal elements together into a strong and accurate assembly with a minimum of skill and care.

Another object of my invention is to provide apparatus for sealing a plurality of glass and metal elements into a single assembly in a rapid and convenient manner.

Still other objects and advantages of my invention will appear from the following description and from the drawing.

Figure 6:
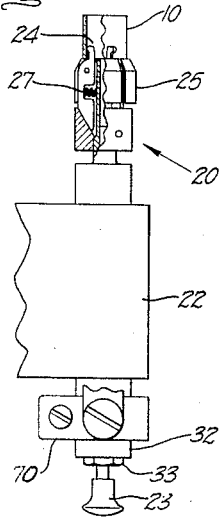
Figure 4:
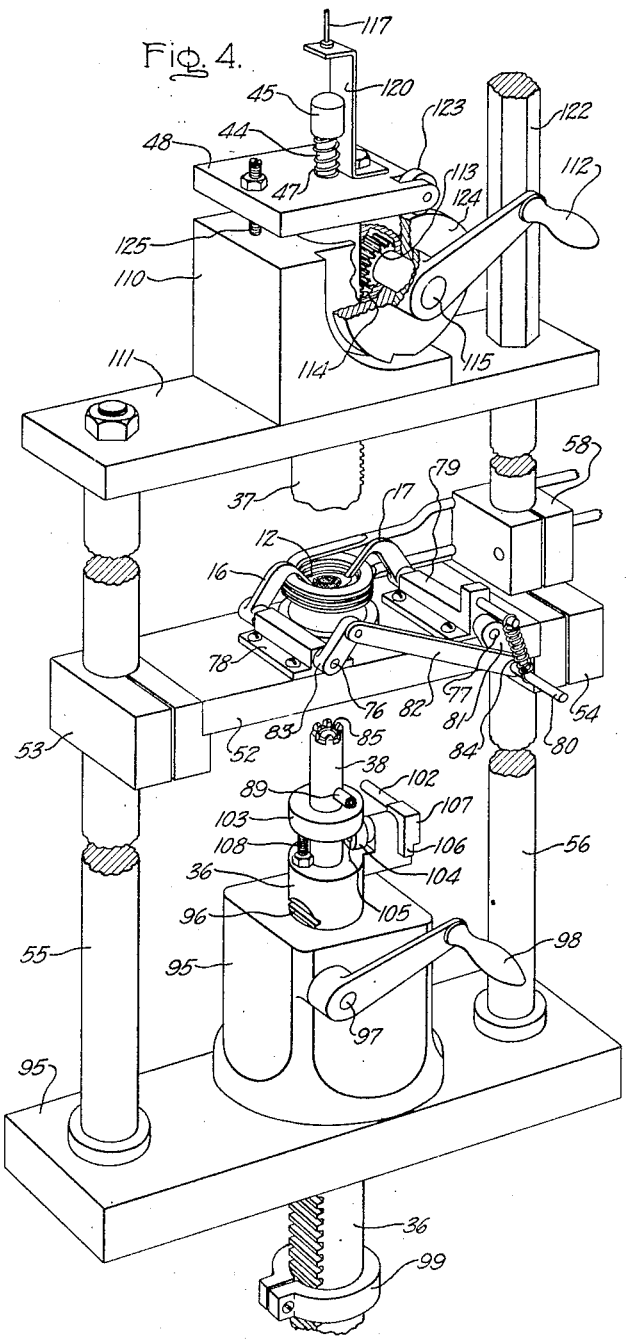

In the drawing Fig. 1 is a front elevation of apparatus for sealing together a series of three metal elements and two glass elements of an electronic device, the forward supporting column and attached means of said apparatus being cut away to show other portions thereof; Fig. 2 is a plan view of the sealing apparatus; Fig. 3 is a fragmentary side elevation, on a large scale, of the glass and metal element holding portions of said apparatus in the final step in sealing said elements together; Fig. 4 is a perspective view of the essential operating members of the upper, intermediate and lower portions of the sealing apparatus; Fig. 5 is a vertical section of the upper glass element holder; and Fig. 6 is a side elevation partially broken away of the lower glass element holder.

The course of operations of the apparatus shown provides first for the sealing of an end of the glass elements 10 and 11 (Fig. 3) which are in the form of short lengths of tubing, to opposite sides of a metal disc shaped element 12; and immediately thereafter, while said elements 10, 11 and 12 are still at somewhat elevated temperatures, sealing of the opposite ends of the glass elements 10 and 11 to the metal elements 13 and 14. These elements form, when sealed together, one sub-assembly of an electronic device and in the course of the sealing operation must be caused to take a very definite relation to each other to function properly in said device.

The disc shaped element 12 is usually the first element inserted in the apparatus and is manually placed in a recess at the top of the hollow conical support 15. At such times the hold-down fingers 16 and 17 are swung back from the position in which they are shown and easy access to the top of the support 15 can be gained through the open top of the high frequency induction coil 18. The annular disc shaped element 12, which is indented about the opening at its center and has a screen 19 welded over the opening, is placed in the support 15 with the raised portion of the indenture and the screen 19 uppermost.

The glass elements 10 and 11 are inserted in lower and upper holders 20 and 21 in corresponding branches of a U-shaped arm 22 which is located to one side of the support 15 and induction coil 18. The buttons 23 and 23' at the ends of the holders 20 and 21 respectively are pulled outward manually to draw together the outer ends of the three gripping fingers 24 on holder 20 and the three fingers 24' on holder 21 so that the glass elements 10 and 11 can be passed over the said outer ends of said fingers 24 and 24' and caused to seat against the heads 25 and 25' of the holders.

When the glass elements 10 and 11 are in place, the buttons 23 and 23' are released so as to cause the fingers 24 and 24' to move out against the inside surface of the elements 10 and 11 to hold said elements in place. As shown in combination with the upper holder 21 (Fig. 5) the fingers 24' are pivoted on pins 26' in the head 25' and are under the constant influence of the expansion force of helical springs 27' in wells of said head 25' which tend to hold them with their outer ends in the retracted position. The gripping motion of the outer ends of fingers 24' is caused by the pressure of a conical sleeve 28' against the angular inner ends of said fingers 24' which pressure is created by the expansion of a spring 29' surrounding the upper end of a rod 30' to which said sleeve 28' is connected by pin 31'. The spring 29' is confined within a well in the spindle 32' which supports the head 25' of the holder 21 and is compressed between a collar 36' on the rod 30' and a guide 33' held by the spindle 32'. Longitudinal slots 34' in the connecting portion of the spindle 32' adjoining the head 25' permit free movement of the pin 31'. The lower holder 20 is similarly constructed, corresponding parts being indicated by unprimed numbers. The upper holder 21 is additionally provided with pins 35 extending from the head 25' thereof adjacent each finger 24' for assisting in guiding the larger glass element 11 over said fingers 24'.

The metal elements 13 and 14 are placed on the opposed ends of the spindles 36 and 37 which lie some distance respectively below and above the support 15 and induction coil 18. The insertion of the metal element 13 in the apparatus consists merely in resting the flange or disc portion 28 thereof on the projecting points or fingers shown at the upper end of the head portion 38 of the spindle 36 with the outer post portion 39 of said element 13 lowermost and the inner anode post portion 40 uppermost.

The metal element 14 consists of a cylindrical shell having one end almost closed off by an inwardly directed flange 41. While in an inverted position, it is manually pushed up over the ends of the spring fingers 42 and other parts of the spindle 37 to the position shown in Fig. 3. At the time of insertion, the spring fingers 42, which extend from the block 43 attached to the rod 44, are caused to take positions farther out from the lower end of the spindle 37 by manual pressure on the knob 45 (Fig. 4) on the end of said rod 44 which extends from the upper end of the spindle 37, so that the central opening in the flange 41 can be easily aligned with said fingers 42 and said flange 41 can be carried completely up over the humps 46 on the lower ends thereof. The subsequent release of the pressure on the knob 45 permits the expansion force of the spring 47, located around said rod 44 between said knob 45 and the plate 48, to lift said rod 44 and fingers 42 so that the flange 41 is carried up against the positioning shoulder 49 on the spindle 37. The spring fingers 42 lie within longitudinal grooves in the plug 50 in the sleeve 51 which grooves permit the spring fingers 42 to bend inward as the flange 41 passes over the humps 46 thereof.

After the proper disposition of the glass and metal elements 10, 11 and 12, 13, 14, respectively, within the apparatus, the disc shaped metal element 12 is heated to sealing temperature by the passage of high frequency electrical currents through the induction coil 18. The metal element 12 is the only part heated by the high frequency currents since the conical support 15 and its supporting plate or base portion 52, which is attached to the clamps 53 and 54 on the two supporting standards 55 and 56 of the apparatus, are made of a refractory such as magnesia.

The connection of the induction coil 18 to the source of current is made, in this particular instance, through a manually operated switch (not shown) and other means (not shown), which means also provides for the circulation of a cooling liquid, preferably water, through the hollow interior of the tubing forming the induction coil 18. The induction coil 18 is supported entirely by its ends which are held between the block 57 and the clamping block 58 on the standard 56 (Figs. 1 and 4). The block 57 and clamping block 58 are made of an insulating material to avoid short-circuiting the induction coil 18.

The glass elements 10 and 11 are brought into sealing relation to the metal element 12 by swinging the arm 22 counterclockwise (or to the right in Fig. 1) so as to position the holders 20 and 21 carrying said glass elements 10 and 11 directly below and above said metal element 12, and then moving the holders 20 and 21 vertically within said arm 22 to bring the glass elements 10 and 11 in contact with bottom and top surfaces of the metal element 12. The arm 22 is fastened to two plates 59 and 59' which are pivotally attached to two clamping blocks 60 and 60' on standard 56 by the bolts 61 and 61' and is swung to the correct position when a laterally offset portion 22' (Fig. 2) at the back thereof engages the stop screw 62 extending from a lug on clamping block 60. Springs 63 and 63' about the bolts 61 and 61' create friction between the plates 59, 59' and clamping blocks 61, 61' and prevent the arm 22 from moving out of position after it is released.

The vertical adjustment of the glass elements 10 and 11 is likewise produced by manual manipulation of the apparatus but is not produced until the cam 64 (Fig. 1), which is pivoted on the stud 65 extending from the arm 22, is swung up out of the path of movement of the lever 66' of the holder actuating means and away from the stop screw 67. At such times, the normal effect of the weight 68 on the operating lever 69 of the actuating means is opposed manually to allow the holders 20 and 21 to bring the glass elements 10 and 11 into position without shock. Other parts of the actuating means comprise the clamps 70 and 70' which are attached to the spindles 32 and 32' of the holders 20 and 21 respectively, the connecting links 71 and 71', the levers 66 and 66' which are pivoted on studs 72 and 72' extending from arm 22, and the links 73 and 73' which are attached to the operating lever 69. The leverage of the actuating means is preferably so proportioned that the effect of the weight 68, spindles 32 and 32', etc., presses equal areas of the glass elements 10 and 11 against the metal element 12 with corresponding force so that the seal made by each glass element 10 or 11 has a corresponding character. A slight upsetting of the edges of the glass elements 10 and 11 results as they become heated by the metal element 12, but this action does not result in objectionable distortion thereof and assures a thorough wetting of said glass elements 10 and 11 to metal element 12 although there are slight nicks or other surface irregularities in the surfaces thereof. At the limit of movement of the holders 20 and 21 the weight 68 turns the operating lever 69 about its pivot screw 74 to such an extent that it rests on the stop screw 75 held by a lug extending from the arm 22.

The high frequency electrical current passing through the induction coil 18 is now switched off to allow the seals to cool, whereupon the hold-down fingers 16 and 17 are swung into engagement with the edge of metal element 12, and the holders 20 and 21 are released from the glass elements 10 and 11 and swung to one side. The hold-down fingers 16 and 17 prevent the metal element 12 and the glass elements 10 and 11, now sealed thereto, from being disturbed by the removal of the holders 20 and 21 and are preferably not brought into contact with said element 12 until it and the seals have cooled to such an extent that the cooling effect of said fingers 16 and 17 is not detrimental thereto. The hold-down fingers 16 and 17 are attached to the shafts 76 and 77 extending from the brackets 78 and 79 on opposite sides of the conical support 15 and are swung into place by manipulation of the handle 80 extending from the arm 81 on shaft 77. A link 82 transfers the motion of handle 80 to the arm 83 extending from shaft 76. In the course of the above operation the spring 84, which extends between a post in bracket 79 and the handle 80, passes to the opposite side of the shaft 77 so that the contraction force of said spring 84 which has held fingers 16 and 17 in the open position is now applied to keeping them against the metal element 12. The release and repositioning of the holders 20 and 21 can both be provided by pulling the buttons 23 and 23' as this force is sufficient to withdraw the fingers 24 and 24' of respective holders and return the weight and actuating means to their original position. The cam 64 should then be turned down into position above the lever 66' to hold the actuating means and the holders 20 and 21 in this position.

Succeeding operations have to do with the heating and the bringing of the metal elements 13 and 14 into sealing relation to the ends of the glass elements 10 and 11 and are begun by manually opening valves (not shown) releasing the combustible gas mixture to the burners 85 and 86 (Figs. 3 and 4) which are in direct association therewith. As shown in combination with the lowermost metal element 13 resting, by its flange 28, on the head 38 of the spindle 36 (Figs. 1 and 3), the burner 85 provides a multiplicity of passages between said head 38 and the sleeve or core 87 in the hollow center thereof and directs a very intense flame against the outer portion of the flange 28. The gas mixture is conducted to burner 85 by the flexible hose 88 (Fig. 1), nipple 89, an opening in the head 38 of the spindle 36 and a passage 87' about the lower end of the core 87. The burner 86, which is associated with the upper spindle 37, is formed by the extended lip 90 thereof and the sleeve 51 which are arranged so as to direct flames onto the inwardly directed flange 41 on the metal element 14. A flexible hose 91, nipple 92, a passage through the spindle 37 and a second passage 93 around the sleeve 51 provide the means of conducting the combustible gas mixture to the burner 86.

The flange 28 of metal element 13 is brought up into sealing relation to the glass element 10 prior to the corresponding adjustment of the metal element 14 by the vertical movement of the spindle 36 which extends down through the bed 95 of the apparatus and the table or bench (not shown) holding the entire apparatus. The spindle 36 provides a rack 96 along its side which is in engagement with a gear (not shown) on the shaft 97 carrying the crank 98, and is manipulated by the manual rotation of said crank 98 first to carry the metal element 13 into contact with the glass element 10 and then, as said element 10 becomes plastic, up to the limit of movement. During this latter interval, the glass element 10 is upset slightly so that all parts of the edge are brought into positive contact with the flange 28 on metal element 13 regardless of any slight imperfections and inaccuracies therein and so that said edge will wet and seal securely thereto. The limit of movement can, if desired, be controlled by a collar 99 clamped to the lower end of the spindle 36 in such a position as to engage the lower surface of the bed 95 and prevent further motion of said spindle 36.

The final position taken by the metal element 13 is dependent on the position taken by the end of its anode post portion 40 with respect to the screen 19 and is not taken until the glass element 10 and the flange portion 28 of metal element 13 are completely fused together whereupon the metal element 13 is lowered a specified distance by the corresponding movement of the head 38 of the spindle 36. Before the lowering movement is performed, the spindle 36 is locked at its upper limit of motion by rotating the screw 100 (Fig. 1) so that said screw 100 is threaded through the bed 95 and bears against the spindle 36; the flow of gas to the burner 25 is turned off; and the metal element 13 is caused to be retained by the head 38 by allowing a source of vacuum connected to the hollow interior of the head 38 to draw thereon. The vacuum is connected to the head 38 through a flexible hose (not shown), the bore of the hollow spindle 36, the bore of the head 38, and the interior of the core 87 in the upper end of which is fitted the post portion 39 of the element 13. The function of the vacuum is to exert sufficient suction on the post portion 39 of the element 13, which almost completely seals the open end of the core 87 (Fig. 3), to hold the flange 28 of the metal element 13 tightly against the head 38 of the spindle 36 during the succeeding lowering movements thereof.

Next in the order of operation is the manual adjustment of the handle 102 (Figs. 1 and 4) which effects a limited lowering movement of the head 38 with respect to the spindle 36 whereby the anode 40 is repositioned with respect to the screen 19 and the sealed portion of the glass element 10 is stretched. The head 38 which slides freely in the bore of the spindle 36 is of sufficient weight so that it always remains at a position established by the engagement of a flange 103 thereon with the cam 104 which is attached to a pin 105 held by a portion of the spindle 36. The said head 38 moves down by its own weight as the cam 104 is rotated by adjustment of handle 102 which extends from the block 107 on the opposite end of pin 105 and brings a portion of less thickness radially below said flange 103. An ear 106 on the block 107 securing the handle 102 to the pin 105 prevents the cam 104 from being turned in the opposite direction whereas a stop screw 108 extending upward from the end of the spindle 36 limits the motion of the flange 103 and, accordingly, of the metal element 13, although the cam 104 is turned sufficiently to allow still further movement. The seal is stretched slightly, .03 inch for instance, by the downward movement of the metal element 13, which stretching improves the strength of the seal and is not sufficient to produce a break therein.

The metal element 14, located on the end of the upper spindle 37, is brought down into sealing relation immediately following the final positioning of the metal element 13 while the metal and glass assembly, now almost completely formed, is still heated considerably. The manual operations necessary to lower the spindle 37 are first to turn the locking screw 109 (Fig. 1) extending from the side of the bearing block 110 on the plate 111 (see Fig. 4) extending between the upper ends of the standards 55 and 56 so as to permit the spindle 37 to slide in the bearing block 110, and then to rotate the crank 112 to cause the gear 113 which engages the teeth of a rack 114 along one side of the spindle 37 to advance said spindle 37. The crank 112 and the gear 113 are mounted on opposite ends of a shaft 115 carried by the bearing block 110 and adjust the spindle 37 and the counterweight 116 (Fig. 2) which is attached thereto through the cable 117 passing up over the sheaves 118 and 119 and the metal strap 120 attached to the plate 48 on the upper end of the spindle 37. A cross arm 121 on the upper end of a post 122 screwed over the end of standard 56 extending through the plate 111 provides the means of supporting the sheaves 118 and 119 above the highest position taken by the upper end of the spindle 37.

The rate of movement of said spindle 37 is directly in proportion to the size of the gear 113, until the flange 41 of the metal element 14 is almost in contact with the edge of the glass element 11, whereupon said gear 113 passes from the last tooth of the rack 114 and that part of the weight of the spindle 37, which is not balanced out by counterweight 116 causes said spindle 37 to move down still farther. This latter movement is controlled, as the roller 123 held by the plate 48 comes to rest on the edge of the cam 124 supported by the shaft 115 and can progress to the extent allowed by said cam 124. The crank 112 is, however, almost immediately turned so that a smaller part of the cam 124 is below the roller 123 and the entire effective weight of said spindle 37 is permitted to force the flange 41 against the glass element 11. The high heat of the metal flange 41 quickly fuses the edge of the glass element 11 to a point where it becomes sealed thereto and is upset by the pressure of engagement until the stop screw 125 on plate 48 comes to rest on the bearing block 110.

The final operation in regard to the manufacture of the glass and metal assembly is now complete and the operator has only to turn off the fires in the burner 86 in the end of the spindle 37 and return all parts of the apparatus to its former position to complete one cycle of operation thereof. The glass and metal assembly is preferably removed from the conical support 15 to an annealing oven containing a hydrogen atmosphere so as to assure definite control over the rate of cooling thereof and produce the maximum strength in said assembly. The hydrogen removes all the black copper oxide formed on the metal surfaces during the sealing operations.

The proper functioning of all parts of the assembly disclosed is dependent on the proper positioning of the anode post portion 40 of the metal member 13 and the flange portion 41 of metal member 14 with respect to the screen 19 on the central metal member 12 of said assembly. To control the positioning of these elements 13 and 14 requires care in properly fixing the limits of movement of the lower and upper spindles 36 and 37 and may, in certain instances where the metal elements 12, 13 and 14 are not made with the desired accuracy, require other means for establishing these limits of movement during each cycle of operation. Under either condition it is preferred that the positions taken by the spindles 36 and 37 be determined by actual contact with the bottom and top surfaces of the screen 19 and that said contacts establish electrical connections between the end of the anode post 40 and the screen 19, and the contact 126 (Figs. 1 and 3) and said screens 19 respectively. The contact 126 is secured to the end of spindle 37. The metal element 12 is connected to one side of a source of electricity through one of the holddown fingers 17 (Fig. 3) and conductor 127 whereas the anode post 40 and contact 126 are connected to the opposite side of the source of electricity through spindle 36, conductor 128, indicator lamp 129, conductor 130, and the parts of the spindle 37, conductor 131, indicator lamp 132, conductor 133, respectively. The respective indicator lamps 129 and 132 are lighted when either the anode post 40 or contact 126 (which bears a definite relation to the metal element 14) touches the screen 19, the usual method of operation being to set the stop collar 99 when the spindle 36 is raised to such an extent that the lamp 129 is lighted and to set the stop screw 125 when the spindle 37 is lowered to the full limit of its movement which is indicated by the lighting of lamp 132. If each cycle of operation of the apparatus is to be controlled by the operations of the indicator lamps 129 and 132, the stop collar 99 is dispensed with. In either case the spindle 36 is locked at its upper limit of movement by rotation of screw 100 and the head 38 is lowered separately the desired distance to the final position controlled by stop screw 108 by manual adjustment of cam 104. Since no readjustment of the metal element 14 and upper spindle 37 is usually desired, the stop screw 125 can be dispensed with and the final position controlled entirely by the pre-set relation of the contact 126 to the metal element 14 and the lighting of the lamp 132.

What I claim as new and desire to secure by Letters Patent of the United States is:

1. Apparatus for sealing tubular glass elements to metal elements to form an assembly for an electrical device of the class described comprising a refractory support for the metal element, an induction coil surrounding a portion of the refractory support adapted to be connected to a source of high frequency current to cause the metal element to be heated, holder means for the tubular glass element, means mounting said holder means for movement into a definite relation to the refractory support to align the said glass and metal elements and for movement toward said refractory support to press an end of the tubular glass element against the metal element to cause said end to be fused and sealed thereto, holding means for a second metal element, means mounting said holding means for movement into a definite relation to the refractory support for pressing a second metal element against the opposite end of the tubular glass element, and means disposed adjacent the refractory support for heating the second metal element to cause the engaging end of the tubular glass element to be fused and sealed thereto.

2. Apparatus for sealing tubular glass elements to metal elements to form an assembly for an electrical device of the class described comprising a refractory support for the metal element, an induction coil surrounding a portion of the refractory support adapted to be connected to a source of high frequency current to cause the metal element to be heated, movable means adjacent said refractory support carrying a holder for the tubular glass element and constructed and arranged to swing said holder into and out of alignment with the metal element in said refractory support and also mounting said holder for movement toward said refractory support to carry an end of the tubular glass element against the metal element to cause said end to be fused, upset and sealed thereto, holding means for a second metal element aligned with the refractory support, means mounting said holding means for movement toward said support for advancing a second metal element into engagement with the opposite end of the tubular glass element, and means disposed adjacent the refractory support for heating the second metal element to cause the engaging end of the tubular glass element to be fused and sealed thereto.

3. Apparatus for sealing tubular glass elements to opposite sides of a metal element to form an assembly for an electric device of the class described comprising a refractory support for the metal element, an induction coil surrounding a portion of the refractory support adapted to be connected to a source of high frequency current to cause the metal element to be heated, means for holding tubular glass elements on opposite sides of the refractory support, and means mounting said holding means for movement toward said support for pressing the ends of tubular glass elements against opposite sides of the metal element to cause said ends to be fused, upset and sealed thereto.

4. Apparatus for sealing tubular glass elements to opposite sides of a metal element to form an assembly for an electric device of the class described comprising a refractory support for the metal element, an induction coil surrounding a portion of the refractory support adapted to be connected to a source of high frequency current to cause the metal element to be heated, means movable into operative relation to the refractory support for holding the metal element in place thereon, means for holding tubular glass elements on opposite sides of the refractory support and means mounting the last-mentioned holding means for movement toward said support for pressing the ends of tubular glass elements against opposite sides of the metal element to cause said ends to be fused, upset and sealed thereto.

5. Apparatus for sealing tubular glass elements to opposite sides of a metal element to form an assembly for an electric device of the class described comprising a refractory support for the metal element, an induction coil surrounding a portion of the refractory support adapted to be connected to a source of high frequency current to cause the metal element to be heated, movable holders for holding the glass elements on opposite sides of the refractory support having means to grip and position said tubular glass elements, and means mounting the holders for movement toward the refractory support for pressing the ends of the tubular glass elements against opposite sides of the metal element to cause said ends to be fused, upset and sealed thereto.

6. Apparatus for sealing tubular glass elements to opposite sides of a metal element to form an assembly for an electric device of the class described comprising a refractory support for the metal element, an induction coil surrounding a portion of the refractory support adapted to be connected to a source of high frequency current to cause the metal element to be heated, movable holders for holding the glass elements on opposite sides of the refractory support having means to grip and position said tubular glass elements, means mounting said holder for movement in corresponding manner toward the refractory support to carry the ends of the tubular glass elements into engagement with opposite sides of the metal element to cause said ends to be heated and fused thereby, said means including a weight controlling the operation thereof for determining the pressure of engagement of the tubular glass elements with the metal element to cause a limited upsetting and proper sealing of the glass elements thereto.

7. Apparatus for sealing a tubular glass element to metal elements to form an assembly for an electric device of the class described comprising a refractory support for a metal element, an induction coil surrounding a portion of the refractory support adapted to be connected to a source of high frequency current to cause the metal element to be heated, means for holding the glass element at one side of the refractory support, means mounting said holding means for movement for pressing an end of the tubular glass element against the metal element to cause said end to be fused and sealed thereto, movable means for holding a second metal element at the side of the refractory support, means mounting said last-mentioned holding means for movement for pressing a second metal element into engagement with opposite end of the tubular glass element and means adjacent said last-mentioned holding means for heating the second metal element to cause the end of the glass element to be fused and sealed thereto.

8. Apparatus for sealing a tubular glass element to metal elements to form an assembly for an electric device of the class described comprising a refractory support for a metal element, an induction coil surrounding a portion of the refractory support adapted to be connected to a source of high frequency current to cause the metal element to be heated, means for holding the glass element at one side of the refractory support, means mounting said holding means for movement for pressing an end of the tubular glass element against the metal element to cause said end to be fused and sealed thereto, movable holding means located in alignment and still farther to the side of the refractory support having means to grip and heat a second metal element, and means mounting the movable holding and heating means for movement toward the refractory support to press the second metal element against the opposite end of the tubular glass element to cause said end to fuse and seal thereto.

9. Apparatus for sealing a tubular glass element to metal elements to form an assembly for an electric device of the class described comprising a refractory support for a metal element, an induction coil surrounding a portion of the refractory support adapted to be connected to a source of high frequency current to cause the metal element to be heated, means for holding the glass element at one side of the refractory support, means mounting said holding means for movement for pressing an end of the tubular glass element against the metal element to cause said end to be fused and sealed thereto, movable holding means located still farther to the side of the refractory support for holding a second metal element, means adjacent said last mentioned holding means for heating the second metal element, and means mounting said last-mentioned holding means for movement to cause the movable means to press the second metal element against the glass element to cause said glass element to be fused, upset and sealed thereto and for thereafter repositioning said movable means to adjust the seal and position the second metal element at a definite relation to the other metal element.

10. Apparatus for sealing tubular glass elements and metal elements together to form an assembly for an electrical device of the class described comprising a refractory support for a metal element, an induction coil surrounding a portion of the refractory support adapted to be connected to a source of high frequency current to cause the metal element to be heated, means for holding glass elements at opposite sides of the refractory support, means mounting said holding means for movement for pressing the ends of the tubular glass elements against opposite sides of the metal element to cause said ends to be fused and sealed thereto, other movable means for holding other metal elements on opposite sides of the refractory support, means mounting said last-mentioned holding means for movement for carrying said other metal elements into engagement with the opposite ends of the tubular glass elements, and means adjacent said last-mentioned holding means for heating the last-mentioned metal elements to cause the contacting ends of the tubular glass elements to be fused and sealed thereto.

11. Apparatus for sealing a tubular glass element to metal elements to form an assembly for an electric device of the class described comprising a refractory support for a metal element, an induction coil surrounding a portion of the refractory support adapted to be connected to a source of high frequency current to cause the metal element to be heated, means for holding the glass element at one side of the refractory support, means mounting said holding means for movement for pressing an end of the tubular glass element against the metal element to cause said end to be fused and sealed thereto, movable means for holding a second metal element at the side of the refractory support, means mounting said last-mentioned holding means for movement for pressing the second metal element into engagement with the opposite end of the tubular glass element, means adjacent said last-mentioned holding means for heating the second metal element to cause the end of the glass element to be fused, upset and sealed thereto, and means including a contact member carried by said last-mentioned holding means in position to engage the metal element held by the refractory support during the upset of the seal to indicate a definite spacial relation between the metal elements.

12. Apparatus for sealing a tubular glass element to metal elements to form an assembly for an electric device of the class described comprising a refractory support for a metal element, an induction coil surrounding a portion of the refractory support adapted to be connected to a source of high frequency current to cause the metal element to be heated, means for holding the glass element at one side of the refractory support, means mounting said holding means for movement for pressing an end of the tubular glass element against the metal element to cause said end to be fused and sealed thereto, movable means for holding a second metal element at the side of the refractory support, means mounting said last-mentioned holding means for movement for pressing the second metal element into engagement with the opposite end of the tubular glass element, means adjacent said last-mentioned holding means for heating the second metal element to cause the end of the glass element to be fused, upset and sealed thereto, indicator means constructed and arranged to effect an indication of contact between portions of the said metal elements, and means to thereafter effect retraction of said last-mentioned holding means together with the second metal element a definite predetermined amount to accurately space said metal elements.

13. Apparatus for sealing tubular glass elements and metal elements together to form an assembly for an electrical device of the class described comprising a refractory support for a metal element, an induction coil surrounding a portion of the refractory support adapted to be connected to a source of high frequency current to cause the metal element to be heated, a pair of holders for holding glass elements at opposite sides of the refractory support, means mounting said holders for movement for pressing the ends of the tubular glass elements against opposite sides of the metal element to cause said ends to be fused and sealed thereto, another pair of holder means holding other metal elements on opposite sides of the refractory support means mounting said last-mentioned holder means for movement for carrying said other metal elements into engagement with the opposite ends of the tubular glass elements, means adjacent said last-mentioned holder means for heating the last-mentioned metal elements to cause the contacting ends of the tubular glass elements to be fused and sealed thereto, means including a contact member carried by one of the last-mentioned pair of holder means in position to engage the first-mentioned metal element held by the refractory support during the upsetting of the seal to indicate a definite spacial relationship between said first-mentioned metal element and the metal element carried by said one of the last-mentioned holder means, indicator means constructed and arranged to effect an indication of contact between portions of the said first-mentioned metal element and the metal element carried by the other of the last-mentioned pair of holder means, and means to thereafter effect a definite predetermined amount of retraction of the said other of the last-mentioned pair of holder means together with the metal element carried thereby.

14. Apparatus of the class described comprising a refractory support for a metal element, an induction coil surrounding said support for heating said metal element, means adjacent said support for holding a tubular glass element with one end thereof against said metal element to fuse said end to the metal element, a spindle in alignment with said support adapted to hold a second metal element, means mounting said spindle for movement toward said support to carry said second metal element against the other end of said tubular element, and gas burner passages in said spindle arranged to direct gas flames against said second metal element to fuse it to the glass element.

15. Apparatus of the class described comprising a refractory support for a metal element, an induction coil surrounding said support for heating said metal element, means adjacent said support for holding a tubular glass element with one end thereof against said metal element to fuse said end to the metal element, a spindle in alignment with said support adapted to hold a second metal element, means mounting said spindle for movement toward and then a predetermined distance away from said support to first carry said second metal element against the other end of said tubular element to effect a fused seal as hereinafter specified and to then stretch the seal a predetermined amount, and gas burner passages in said spindle arranged to direct gas flames against said second metal element to fuse it to the glass element, said spindle also having a vacuum passage therein arranged to securely hold said second metal element while the spindle is retracted to stretch the seal.

16. In apparatus of the class described, means for supporting a member comprising a tubular glass element, a vertically disposed spindle adapted to carry a metal element on its upper end, means mounting said spindle in alignment with said supporting means for movement toward and then retraction a predetermined distance away from said supporting means, gas burner passages extending longitudinally to the upper end of said spindle to direct gas flames against said metal element to fuse it to the glass element, said spindle also having a vacuum passage open at its upper end to securely hold said metal element during the aforesaid retraction of said spindle to stretch the seal.

17. Apparatus for fusing together the parts of an assembly comprising two axially aligned glass tubes, an intermediate metal disc and metal end members having disc-like portions, said apparatus comprising support means for the metal disc, an electrical induction coil surrounding said support means for heating said disc, a pair of opposed holders arranged to support the glass tubes in axial alignment on opposite sides of said disc, means mounting said holders for movement toward said support means and disc to press an end of each of the glass tubes against opposite surfaces of the heated disc to fuse them to the disc, and a pair of opposed supports for holding the metal end members on opposite sides of said disc support means and having associated therewith circular gas burners for heating an annular zone of the disc-like portions of said end members, means mounting said opposed supports for movement toward the disc support means and the other ends of the glass tubes to press the heated portions of said end members against the said other ends of the glass tubes.

ALFRED GREINER.

REFERENCES CITED

The following references are of record in the file of this patent:

UNITED STATES PATENTS

| Number | Name | Date |
|---|---|---|
| 2,121,627 | Donovan et al. | June 21, 1938 |
| 2,125,316 | Ronci | Aug. 2, 1938 |
| 2,222,093 | Swanson | Nov. 19, 1940 |
| 2,290,050 | Hinkley et al. | July 14, 1942 |
| 2,297,492 | Michaelis | Sept. 29, 1942 |
| 2,320,941 | Litton | June 1, 1943 |
| 2,335,617 | Thomas et al. | Nov. 30, 1943 |
| 2,361,517 | White et al. | Oct. 31, 1944 |
| 2,374,546 | Laico | Aug. 24, 1945 |
| 2,376,439 | Machlett et al. | May 22, 1945 |
| 2,386,820 | Spencer | Oct. 16, 1945 |
| 2,411,184 | Beggs | Nov. 19, 1946 |
| 2,415,412 | Buchwald et al. | Feb. 11, 1947 |